United States Patent
Ashida et al.

(10) Patent No.: US 7,100,126 B2
(45) Date of Patent: Aug. 29, 2006

(54) ELECTRICAL FORM DESIGN AND MANAGEMENT METHOD, AND RECORDING MEDIUM

(75) Inventors: Hitoshi Ashida, Kawasaki (JP); Masashi Tsuchida, Machida (JP); Naoko Taniguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 10/701,170

(22) Filed: Nov. 5, 2003

(65) Prior Publication Data
US 2004/0261047 A1 Dec. 23, 2004

(30) Foreign Application Priority Data
Jun. 19, 2003 (JP) ............................. 2003-174271

(51) Int. Cl.
*G06F 17/50* (2006.01)
(52) U.S. Cl. ..................... 716/1; 716/4; 716/5; 716/11
(58) Field of Classification Search ................ 716/1, 716/4–5, 11, 18
See application file for complete search history.

(56) References Cited

U.S. PATENT DOCUMENTS

| | | | |
|---|---|---|---|
| 5,790,416 A * | 8/1998 | Norton et al. ............... | 716/11 |
| 6,530,065 B1 * | 3/2003 | McDonald et al. ........... | 716/4 |
| 6,851,094 B1 * | 2/2005 | Robertson et al. ........... | 716/1 |
| 2002/0188910 A1 * | 12/2002 | Zizzo ......................... | 716/1 |
| 2003/0061201 A1 | 3/2003 | Grefenstette et al. | |

* cited by examiner

*Primary Examiner*—Paul Dinh
(74) *Attorney, Agent, or Firm*—McDermott Will & Emery LLP

(57) ABSTRACT

An electrical form design and management method for conducting design and management on electrical forms provides a technique capable of improving the maintenance efficiency of electrical forms. The method includes a step of referencing mapping information, which associates electrical forms with components used in the electrical forms, and searching for electrical forms using an updated component, and a step of updating or adding components used in the electrical forms obtained by the search or mapping information of the electrical forms, and thereby updating or generating electrical forms.

6 Claims, 16 Drawing Sheets

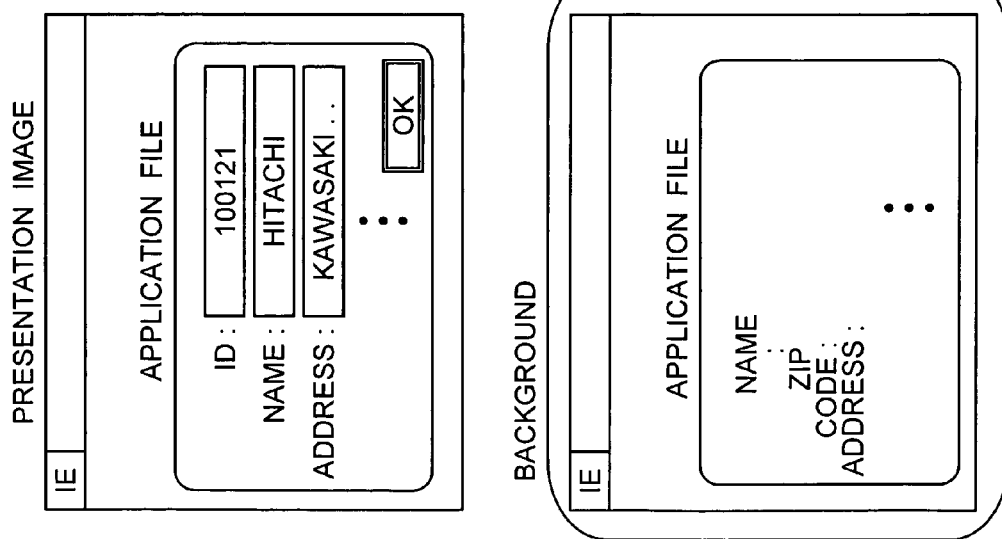

FIG. 3A

MODEL PRESENTATION TABLE 301

| MODEL PRESENTATION ID | MODEL PRESENTATION NAME | MODEL PRESENTATION CONTENTS | KEYWORD |
|---|---|---|---|
| M001 | Model001 | <ef:presentation>.. | key_word1 |
| M002 | Model002 | <ef:presentation>.. | key_word2 |
| M003 | Model003 | <ef:presentation>.. | key_word3 |
| : | : | : | : |

FIG. 3B

CONSTRAINT TABLE 302

| CONSTRAINT ID | CONSTRAINT NAME | CONSTRAINT CONTENTS | KEYWORD |
|---|---|---|---|
| C001 | Con001 | <xforms:bind ref="ID".. | key_word1 |
| C002 | Con002 | <xforms:bind ref="name".. | key_word1 |
| C003 | Con003 | <xforms:bind ref="zip code" | key_word2 |
| : | : | : | : |

FIG. 3C

BACKGROUND TABLE 303

| BACKGROUND ID | BACKGROUND NAME | BACKGROUND CONTENTS | KEYWORD |
|---|---|---|---|
| B001 | BG001 | ■ ■ ■ ■ ■.. | key_word1 |
| B002 | BG002 | ■ ■ ■ ■ ■.. | key_word1 |
| B003 | BG003 | ■ ■ ■ ■ ■.. | key_word2 |
| : | : | : | : |

FIG. 3D

MAPPING INFORMATION TABLE 304

| FORM ID | FORM NAME | MODEL PRESENTATION ID | CONSTRAINT ID | BACKGROUND ID | KEYWORD |
|---|---|---|---|---|---|
| F001 | APPLICATION 1 | M001 | C001 | B001 | KAWASAKI CITY |
| F002 | APPLICATION 2 | M001 | C001 | B002 | YOKOHAMA CITY |
| F003 | APPLICATION 3 | M001 | C002 | B003 | KAMAKURA CITY |
| : | : | : | : | : | : |

FIG. 4

FORMS SEARCH VIEW

FILE

SEARCH CONDITIONS — 401

FORM
FORM NAME: [APPLICATION] INCLUDE
KEYWORD: [        ] INCLUDE

MODEL PRESENTATION
MODEL NAME: [        ] INCLUDE
KEYWORD: [        ] INCLUDE

BACKGROUND
BACKGROUND NAME: [        ] INCLUDE
KEYWORD: [        ] INCLUDE

[SEARCH]

SEARCH RESULT — 402

| FORM ID | FORM NAME | KEYWORD | MODEL PRESENTATION NAME |
|---|---|---|---|
| F001 | APPLICATION 1 | KAWASAKI CITY | Model001 |
| F002 | APPLICATION 2 | YOKOHAMA CITY | Model001 |
| F003 | APPLICATION 3 | KAMAKURA CITY | Model001 |
| F004 | APPLICATION 4 | SAGAMIHARA CITY | Model001 |

[OK]

403:
SEARCH CONDITIONS
SEARCH NAME : APPLICATION
KEYWORD :
MODEL NAME :
KEYWORD :
BACKGROUND NAME :
KEYWORD :
SELECTED FORM ID : F001

FIG. 6

FORM UPDATING INFORMATION

<TARGET COMPONENT : C001>

TARGET COMPONENT KIND : CONSTRAINT

TARGET TAG : ID

ALTERATION CONTENT :

NUMBER OF CHARACTERS : 5

MINIMUM VALUE : 10001

MAXIMUM VALUE : 99999

<FORM ALTERATION KIND>

F001 : SAVING UNDER ALIAS

F002 : SAVING UNDER ALIAS

F003 : OVERWRITE SAVING

F004 : NO ALTERATIONS

FIG. 8

FORM ALTERATION KIND SETTING VIEW

801 — TARGET FORM
FORM ID : FD2001  FORM NAME : APPLICATION 1  KEYWORD : KAWASAKI CITY
MODEL PRESENTATION ID : M001  BACKGROUND ID : B001  CONSTRAINT ID : C001

802 — TARGET COMPONENT
CONSTRAINT ID : C001  CONSTRAINT NAME : CON001

803 — FORMS USING "CONSTRAINT ID : C001"

| FORM ID | FORM NAME | KEYWORD | MODEL PRESENTATION ID | CONSTRAINT ID | BACKGROUND ID | FORM ALTERATION KIND | | |
|---|---|---|---|---|---|---|---|---|
| | | | | | | OVERWRITING | SAVING UNDER ALIAS | NO ALTERATIONS |
| F001 | APPLICATION 1 | KAWASAKI CITY | M001 | C001 | B001 | ○ | ◉ | ○ |
| F002 | APPLICATION 2 | YOKOHAMA CITY | M001 | C001 | B002 | ○ | ◉ | ○ |
| F003 | APPLICATION 3 | KAMAKURA CITY | M001 | C001 | B003 | ◉ | ○ | ○ |
| F004 | APPLICATION 4 | SAGAMIHARA CITY | M001 | C001 | B004 | ○ | ○ | ◉ |

CANCEL    REGISTER

FIG. 9A

ALIAS INPUT VIEW — 901

THE COMPONENT HAVING THE CONSTRAINT ID : C001 WILL BE SAVED UNDER AN ALIAS. ENTER A NAME AND A KEYWORD.

CONSTRAINT ID : C001
CONSTRAINT NAME : Con301
KEYWORD : Key_word3

RESULT OF UPDATE — 902

FORM COMPONENTS HAVE BEEN UPDATED AS FOLLOWS:

| FORM ID | FORM NAME | KEYWORD | MODEL PRESENTATION ID | CONSTRAINT ID | BACKGROUND ID | FORM ALTERATION KIND | | |
|---|---|---|---|---|---|---|---|---|
| | | | | | | OVERWRITING | SAVING UNDER ALIAS | NO ALTERATIONS |
| F301 | APPLICATION 1 | key_word1 | M001 | C301 | B001 | ○ | ◎ | ○ |
| F302 | APPLICATION 2 | key_word1 | M001 | C301 | B002 | ○ | ◎ | ○ |
| F003 | APPLICATION 3 | key_word3 | M001 | C301 | B003 | ◎ | ○ | ○ |
| F004 | APPLICATION 4 | key_word4 | M001 | C001 | B004 | ○ | ○ | ◎ |

FIG. 11

ALTERATION CONTENT OF CONSTRAINT CONTENTS FOR RECORD HAVING CONSTRAINT ID = C001

BEFORE ALTERATION

```
<xforms:bind ref="ID" required="true"
   readonly="false" type="user:type" >
<xsd:schema>
<xsd:simpleType name="user:type" >
<xsd:restriction base="xsd:integer" >
   <xsd:totalDigits Value="4" >
   <xsd:minInclusive value="1001" >
   <xsd:maxInclusive value="9999" >
</xsd:restriction>
</xsd:simpleType>
</xsd:schema>
```

AFTER ALTERATION

```
<xforms:bind ref="ID" required="true"
   readonly="false" type="user:type" >
<xsd:schema>
<xsd:simpleType name="user:type" >
<xsd:restriction base="xsd:integer" >
   <xsd:totalDigits Value="5" >
   <xsd:minInclusive value="10001" >
   <xsd:maxInclusive value="99999" >
</xsd:restriction>
</xsd:simpleType>
</xsd:schema>
```

FIG. 12A

COMPONENT GRANT MANAGEMENT TABLE  1201

| COMPONENT ID | OWNER | GRANTEE | PRIVILEGE |
|---|---|---|---|
| C001 | USER A | USER B | OVERWRITING |
| C001 | USER A | USER C | OVERWRITING |
| : | : | : | : |
| M003 | USER Z | USER A | REFERENCING |
| : | : | : | : |

FIG. 12B

FORM GRANT MANAGEMENT TABLE  1202

| FORM ID | OWNER | GRANTEE | PRIVILEGE |
|---|---|---|---|
| F001 | USER A | USER B | OVERWRITING |
| F001 | USER A | USER C | OVERWRITING |
| F002 | USER Z | USER B | REFERENCING |
| : | : | : | : |

FORM ALTERATION PRIVILEGE SETTING PROCESSING

FIG. 14

FORM ALTERATION KIND SETTING VIEW IN VERIANT

TARGET FORM

FORM ID : FD2001  FORM NAME : APPLICATION 1  KEYWORD : KAWASAKI CITY
MODEL PRESENTATION ID : M001  BACKGROUND ID : B001  CONSTRAINT ID : C001

TARGET COMPONENT

CONSTRAINT ID : C001  CONSTRAINT NAME : CON001

FORMS USING "CONSTRAINT ID : C001"

| FORM ID | FORM NAME | KEYWORD | MODEL PRESENTATION ID | CONSTRAINT ID | BACKGROUND ID | FORM ALTERATION KIND | | |
|---|---|---|---|---|---|---|---|---|
| | | | | | | OVERWRITING | SAVING UNDER ALIAS | NO ALTERATIONS |
| F001 | APPLICATION 1 | KAWASAKI CITY | M001 | C001 | B001 | ○ | ◉ | ○ |
| F002 | APPLICATION 2 | YOKOHAMA CITY | M001 | C001 | B002 | ✕ | ◉ | ○ |
| F003 | APPLICATION 3 | KAMAKURA CITY | M001 | C001 | B003 | ✕ | ✕ | ◉ |
| F004 | APPLICATION 4 | SAGAMIHARA CITY | M001 | C001 | B004 | ✕ | ✕ | ◉ |

[REGISTER]  [CANCEL]

ELECTRICAL FORM DESIGN AND MANAGEMENT METHOD, AND RECORDING MEDIUM

BACKGROUND OF THE INVENTION

The present invention relates to an electrical form design and management apparatus for conducting design and management of electrical forms.

Conventionally, the PDF (Portable Document Format) has been opened to the public as a format of forms. As a format of forms available on the web in recent years, however, XForms is attracting notice. This is a format of the next generation web form which is being established by WWWC (World Wide Web Consortium). Its candidate recommendation was opened to the public on Nov. 12, 2002 (see, for example, [0238] of US2003/0061201A1) where XForms has also been introduced ([0238] and [0250]).

This aims at using one piece of contents in a plurality of devices, such as personal computers and cell phones, by separating presentation and contents in the XHTML form.

Here, presentation prescribes a presentation method on presentation of the browser or the like. For example, the presentation prescribes an alternative component, such as a text area or a drop-down list. Whether an alternative component is presented by a drop-down list or presented by a radio button depends upon the device or the related language. However, it is also a feature of XForms to prescribe the presentation method with an abstract level that does not depend on the device.

Contents are broadly classified into instance data, model and constraint. The instance data is data input to the form. For example, data input to the text area of the presentation described earlier is stored. In the model, the member and data type of the input data are prescribed. In the constraint, an upper limit value and a lower limit value of data for each member of the model, or whether the member should be permitted to input data is included.

When conducting development and maintenance on several thousands to several tens thousands electrical forms in the conventional technique, conducting development and maintenance on individual electrical forms poses a problem that update oversights occur simultaneously with increased labor and a worsened efficiency.

Furthermore, in the XForms, it has been proposed to define a form by dividing it into presentation and contents. However, a method of efficiently advancing the design/maintenance of forms, such as updating a plurality of forms collectively by using this structure, is not mentioned.

SUMMARY OF THE INVENTION

An object of the present invention is to provide a technique capable of solving the problem and improving the maintenance efficiency of electrical forms.

In accordance with the present invention, an electrical form design and management apparatus for conducting design and management on electrical forms updates or generates collectively electrical forms using an updated component.

If a user updates a component in a certain electrical form, the electrical form design and management apparatus according to the present invention references mapping information, which associates electrical forms with components used in the electrical forms, and searches for electrical forms using the updated component, by using related forms search processing. The components are three kinds: a model presentation component for indicating constituent elements of each of the electrical forms and their disposition locations, a constraint component for indicating constraints concerning the presentation, input and printing of the constituent elements, and an image component serving as a background when presenting a form. However, other components may be defined and used.

Subsequently, the electrical form design and management apparatus accepts specification, such as overwrite saving, saving under an alias, or no alteration, as an alteration kind for each of the electrical forms obtained by the search, and then checks on the content of the alteration kind. If all alteration kinds indicate that the overwrite saving should be conducted, processing of overwrite-saving the updated component with the update content is conducted. If an alteration kind other than the overwrite saving is included in the alteration kinds, the updated component is registered under an alias. Thereafter, as for electrical forms specified to be subject to overwrite saving, the component name of the updated component in their mapping information is altered to the registered alias. As for electrical forms specified to be subject to saving under an alias, processing of generating a replica of their mapping information, then altering the component name of the updated component in the replica to the registered alias, and adding a resultant replica as new mapping information.

According to the present invention, electrical forms are managed by classifying them into components, such as the model presentation, the constraint and the background, and the components are updated, as described above. It thus becomes possible to update a plurality of electrical forms and generate new electrical forms. As a result, the efficiency of maintenance and development of electrical forms can be improved. Furthermore, by managing the privileges of referencing and updating the components and electrical forms, it is also possible to prevent an unintended user from making a mistake in updating components and forms.

According to the electrical form design and management apparatus of the present invention, electrical forms using an updated component are updated or generated collectively. As a result, the maintenance efficiency of electrical forms can be improved.

BRIEF DESCRIPTION OF THE DRAWINGS

FIGS. 2A and 2B are diagrams showing an example of a presentation image of a form in an embodiment and an example of a source file of the form, respectively;

FIGS. 3A to 3D are diagrams showing examples of tables for storing components of a form of an embodiment and a mapping information table 112 for storing association information among the components;

FIG. 4 is a diagram showing an example of a form search view in an embodiment;

FIG. 6 is a diagram showing an example of form updating information 103 in an embodiment;

FIG. 8 is a diagram showing an example of a form alteration kind setting view obtained as an execution result of target forms search processing indicated to a user 101 in an embodiment;

FIGS. 9A and 9B are diagrams showing presentation examples of a view for inputting a name of a component to be saved under an alias and a keyword in an embodiment;

FIG. 11 is a diagram showing an alteration content in contents of a constraint C001 in an electrical form design and management apparatus of an embodiment;

FIGS. 12A and 12B are diagrams showing examples of tables for grant management in an embodiment;

FIG. 14 is a diagram showing a presentation view example for a processing result of target forms search processing in a variant of an embodiment;

DESCRIPTION OF THE EMBODIMENTS

Hereafter, an embodiment of an electrical form design and management apparatus for updating components included in electrical forms, thereby updating one or more forms collectively, and conducting design and management on electrical forms will be described.

Figure 1:
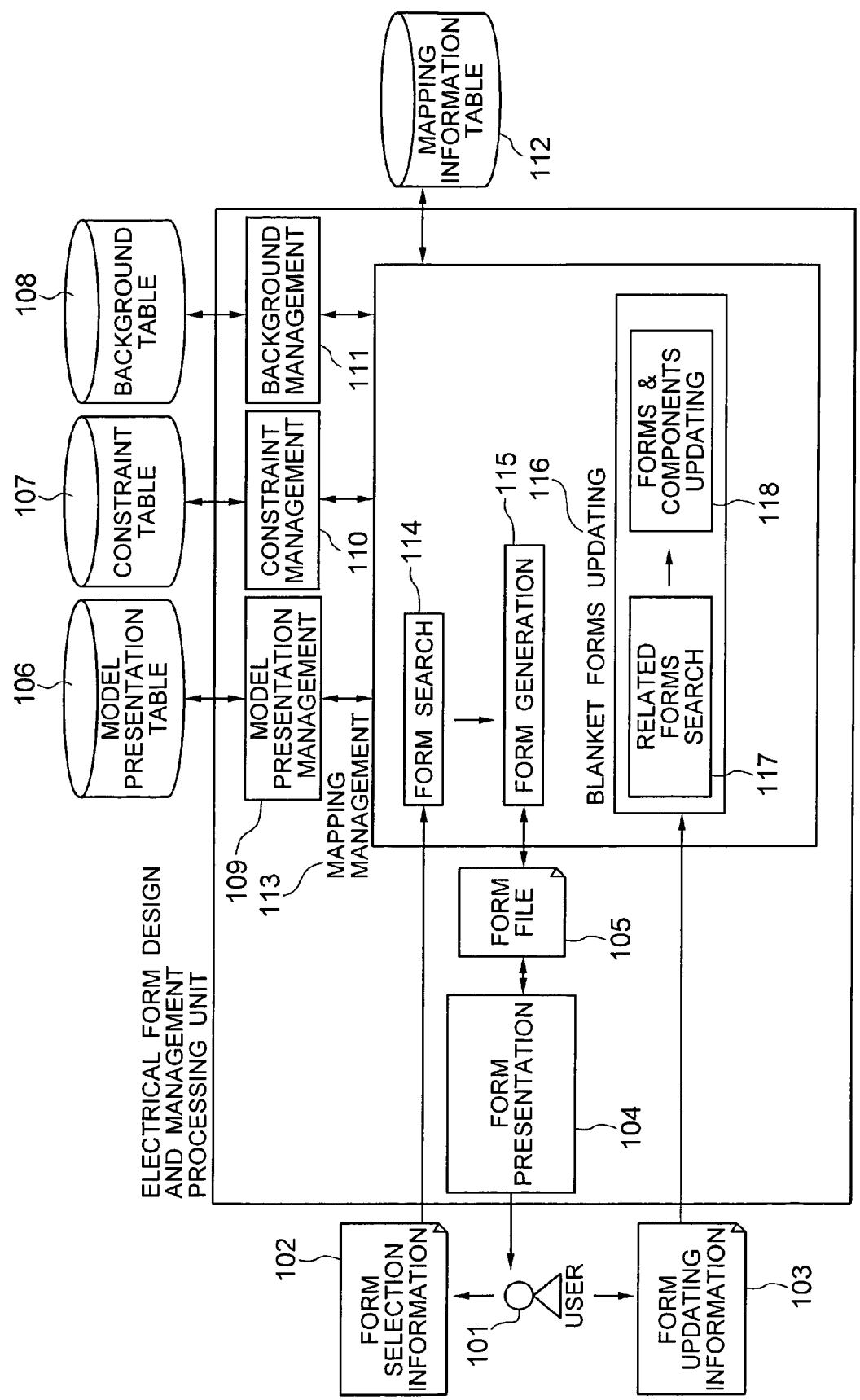
FIG. 1 is a schematic diagram showing processing conducted in an electrical form design and management apparatus of an embodiment and data relating thereto.

FIG. 1 is a schematic diagram showing processing conducted in an electrical form design and management apparatus of the present embodiment and data related to the processing. As shown in FIG. 1, the electrical form design and management apparatus of the present embodiment includes a related forms search module 117 and a forms & components updating module 118.

The related forms search module 117 is a processing unit for referencing mapping information that associates electrical forms with components used in respective forms, and searching for electrical forms using updated components. The forms & components updating module 118 is a processing unit for updating or adding components used in the electrical forms searched for or mapping information of the electrical forms and thereby updating or generating the electrical forms.

A program for causing the electrical form design and management apparatus to function as the related forms search module 117 and the forms & components updating module 118 is recorded on a recording medium such as a CD-ROM, stored on a magnetic disk or the like, thereafter loaded into a memory and executed. The recording medium for recording the program may be a recording medium other than the CD-ROM. Furthermore, the program may be installed from the recording medium into an information processing apparatus. Or, it is also possible to access the recording medium via a network and use the program.

Targets of the present embodiment are forms each composed of components of three kinds: a model of data input to and output from the form and its presentation method; constraints for limiting the type, an upper limit and a lower limit of the input and output data; and a background image indicating common information concerning the target of the form, such as a name of a local self-governing body and a fiscal year in which the form is used. The targets may also be forms formed of components other than them.

FIGS. 2A and 2B are diagrams showing an example of a presentation image of a form in an embodiment and an example of a source file of the form, respectively. As shown in FIG. 2B, the source file includes a model presentation section and a background image section. The model presentation section includes a constraint.

Forms handled in the present embodiment are divided into model presentation components, constraint components, and background components. The components are stored in a model presentation table 106, a constraint table 107 and a background table 108, that serve as respective databases. A combination of three components forming each form is stored in a mapping information table 112.

FIGS. 3A to 3D are diagrams showing examples of tables for storing components included in a form of an embodiment and the mapping information table 112 for storing association information among the components. Formats shown in FIGS. 3A to 3D will now be described.

A model presentation table 301 includes a model presentation ID column for identifying model presentation information, a model presentation name column for storing a name of the model presentation information, a model presentation contents column for storing model presentation information itself, and a keyword column for storing a keyword that features the model.

A constraint table 302 includes a constraint ID column for identifying a constraint, a constraint name column for storing a name of the constraint, a constraint contents column for storing the constraint itself, and a keyword column for storing a keyword that features the constraint.

A background table 303 includes a background ID column for identifying a background, a background name column for storing a name of data of the background, a background contents column for storing the data itself of the background, and a keyword column for storing a keyword that features the background.

A mapping information table 304 includes a form ID column for identifying a form, a form name column for storing a name of the form, a model presentation ID column for identifying a model presentation component used for the form, a constraint ID column for identifying a constraint component used for the form, a background ID column for identifying a background component used for the form, and a keyword column for storing a keyword that features the form.

Modules for managing information stored in respective databases will now be described.

A model presentation management module 109 conducts processing of taking out model presentation contents from the model presentation table 106, adding a new record to the model presentation table 106, and updating existing records.

A constraint management module 110 conducts processing of taking out constraint contents from the constraint table 107, adding a new record to the constraint table 107, and updating existing records.

A background management module 111 conducts processing of taking out background contents from the background table 108, adding a new record to the background table 108, and updating existing records.

A mapping management table 113 includes a form search module 114, a form generation module 115, and a blanket forms updating module 116. The form search module 114 is provided to search the mapping information table 112 on the basis of form selection information 102 including information for searching for a form, such as a keyword. The form generation module 115 is provided to reference one record in the mapping information table 112, acquire model presentation contents, constraint contents and background contents respectively via the model presentation management module 109, the constraint management module 110 and the background management module 111 by using the model presentation ID for identifying model presentation contents, the constraint ID for identifying constraint contents, and the background ID for identifying background contents described in the referenced record, as keys, and generate a form file 105. The blanket forms updating module 116 is provided to update a form component in the form file 105 on the basis of form updating information 103, which identifies a component to be updated, and conduct record updating or addition on the model presentation table 106, the constraint table 107, the background table 108 and the mapping information table 112 according to the updated component and its kind.

A form presentation module 104 presents the form file 105 in a format that can be recognized by the user as in the presentation image shown in FIG. 2A, and thereby allows a user 101 to select an updating target component.

The blanket forms updating module 116 will now be described in detail.

The blanket forms updating module 116 includes the related forms search module 117 and the forms & components updating module 118. The related forms search module 117 lists forms using the component specified in the form updating information 103, from the mapping information table 112. The forms & components updating module 118 overwrites the component or save it under an alias on the basis of the form updating information 103, and reflects the updating information of the listed related forms into the mapping information table 112.

A program for causing the electrical form design and management apparatus to function as the related forms search module 117 and the forms & components updating module 118 is recorded on a recording medium such as a CD-ROM, stored on a magnetic disk or the like, thereafter loaded into a memory and executed. The recording medium for recording the program may be a recording medium other than the CD-ROM. Furthermore, the program may be installed from the recording medium into an information processing apparatus. Or, it is also possible to access the recording medium via a network and use the program.

Processing contents of the modules will now be described in detail by using an instance in which a form component is actually updated. First, the user 101 inputs the form selection information 102, and executes processing of the form search module 114.

FIG. 4 is a diagram showing an example of a form search view of the present embodiment. The form search view shown in FIG. 4 includes a search condition input window 401 for inputting a search condition and a search result window 402 for presenting a search result. In the example shown in FIG. 4, only "form name: application" is shown as a form search condition 403. This means that the mapping information table should be searched for records including the word "application" in the form name.

If a "Search" button in the search condition input window 401 is clicked shown in FIG. 4, the form search module 114 executes search and presents a result of the search in the search result window 402. In the search result window 402, the user 101 can select one form from a list of the search result. If an "OK" button is clicked, the form search module 114 reads out a record in which the form ID is an ID of the selected form, such as "F001," and delivers the record to the form generation module 115. Hereafter, the record resulting from the search is referred to as form search result record.

The form generation module 115 generates a form file in which the form ID indicated in the form search result record is F001. Specifically, the form generation module 115 inquires of the model presentation management module 109, the constraint management module 110 and the background management module 111 by using the model presentation ID, the constraint ID and the background ID indicated in the form search result record, as search keys. The model presentation management module 109, the constraint management module 110 and the background management module 111 respectively search the model presentation table 106, the constraint table 107 and the background table 108 for a record having an ID coinciding with a specified ID, and input contents of three kinds in the records to the form generation module 115. Herein, contents of three kinds refer to model presentation contents, constraint contents and background contents.

As shown in the source of FIG. 2B, the form generation table 115 subsequently links the contents of the three kinds. Here, a name of the background contents is substituted into a second line of the source file. Specifically, the following specification is conducted.

<ef:background startX="0" startY="0" width="590" height="840" type="WINEMF" ref="BG001">

Figure 5:
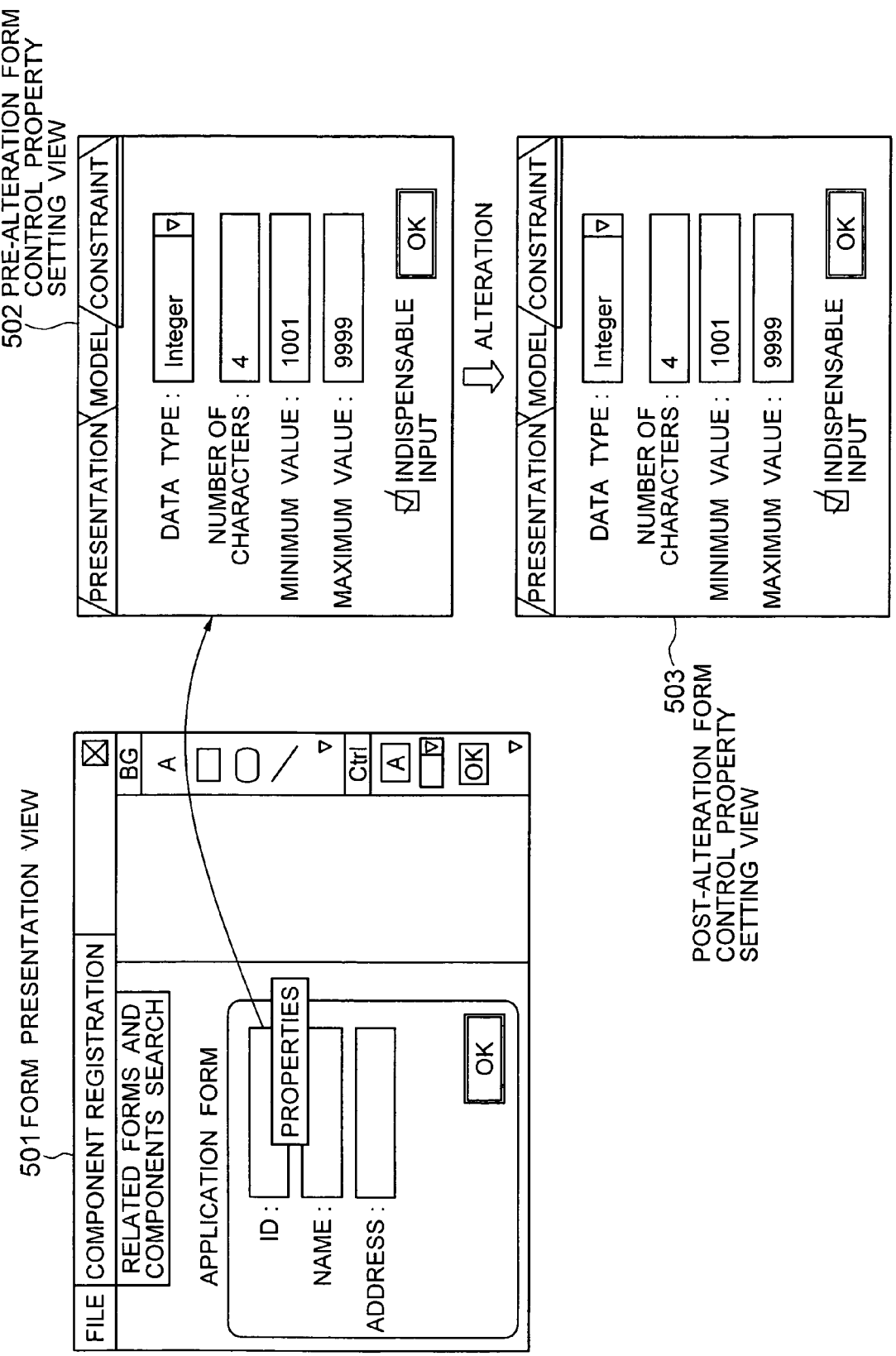
FIG. 5 is a diagram showing a form presentation view for presenting a result of form search in an embodiment, and a presentation example of a property setting view for form control on the presentation view.

FIG. 5 is a diagram showing a form presentation view for presenting a result of the form search in the present embodiment, and a presentation example of a property setting view for form control on the presentation view. A generated file is output as the form file 105, and presented in a format as represented by a form presentation view 501 in FIG. 5 via the form presentation module 104.

If the presented form is not a target form of the blanket updating, then the user 101 closes the form presentation view by clicking a right end of the form presentation view, and selects a form again through the form search view.

If a target form of the blanket updating is presented on the form presentation view 501, the user inputs form updating information to the blanket forms updating module 116.

In the present example, an instance in which the range of the input value of "ID" serving as one of input items of the form is altered will be described. This is an instance in which the constraint is altered.

First, the form presentation view 501 will now be described. In the form presentation view 501, it is possible to present a form and perform an alteration. There are tool bars of two kinds denoted by "BG" and "Ctrl" at the right end of the view. The "BG" means altering the background, and includes components for inputting a character string, a rectangle or a straight line. If these components are dragged and dropped on the form view, the electrical form design and management apparatus of the present embodiment conducts processing of updating background components in the form. The "Ctrl" means form control, and includes components for conducting inputting by using a text box, a composite box or a command button. If these components are dragged and dropped on the form view, the electrical form design and management apparatus of the present embodiment conducts processing of updating model presentation components in the form, in the same way as the case of the background. Detailed setting is conducted on a component property view shown in a pre-alteration form control property setting view 502. The electrical form design and management apparatus of the present embodiment conducts processing of setting a form constraint by using a content input to a constraint page of the present view.

It is supposed that "overwrite," "save as," and "end" are included in a file menu in the form presentation view 501 and "search for related forms and components" and "register" are included in a component registration menu in the form presentation view 501.

In the case where the range of the input value of "ID" serving as one of input items of the form is altered, the user 101 conducts selection in a text box located on the right of characters "ID:" with a pointing device such as a mouse, causes a presentation of "properties," which is a function that can be selected with right-click, and selects a "property" with left-click. If this processing is conducted, the electrical form design and management apparatus of the present embodiment displays the pre-alteration form control property setting view 502. Here, a constraint for the selected input data in the text box is displayed. A data type is set to the integer type (integer value), and the number of characters is set to four characters or less. A minimum value is set to 1001, and a maximum value is set to 9999. Furthermore, "indispensable input" is checked. This means that the user 101 who inputs data to this form must input data to this text box without fail.

The user 101 can alter this constraint as in a post-alteration form control property setting view 503. Specifically, the number of characters has been altered to 5, and the minimum value has been altered to 10001 whereas the maximum value has been altered to 99999. If such alterations are instructed by the user 101, the electrical form design and management apparatus of the present embodiment generates the form updating information for conducting the alterations.

FIG. 6 is a diagram showing an example of form updating information 103 in the present embodiment. As shown in FIG. 6, the form updating information 103 stores a target component kind, a target tag and an alteration content as information for updating a constraint component C001. If the constraint component C001 is overwritten, not only a form F001 presented in the form presentation view 501 but also all forms using C001 are updated. Therefore, the present embodiment provides a function of listing forms including the update target components by using the related forms search module 117 before updating contents of the component in response to an updating instruction from the user 101.

For each of the forms in the list, the user 101 decides whether the form should be overwritten by using the updated component, the form using the updated component should be handled as a form having an alias, or the form should not use the updated component and should not be altered.

Figure 7:
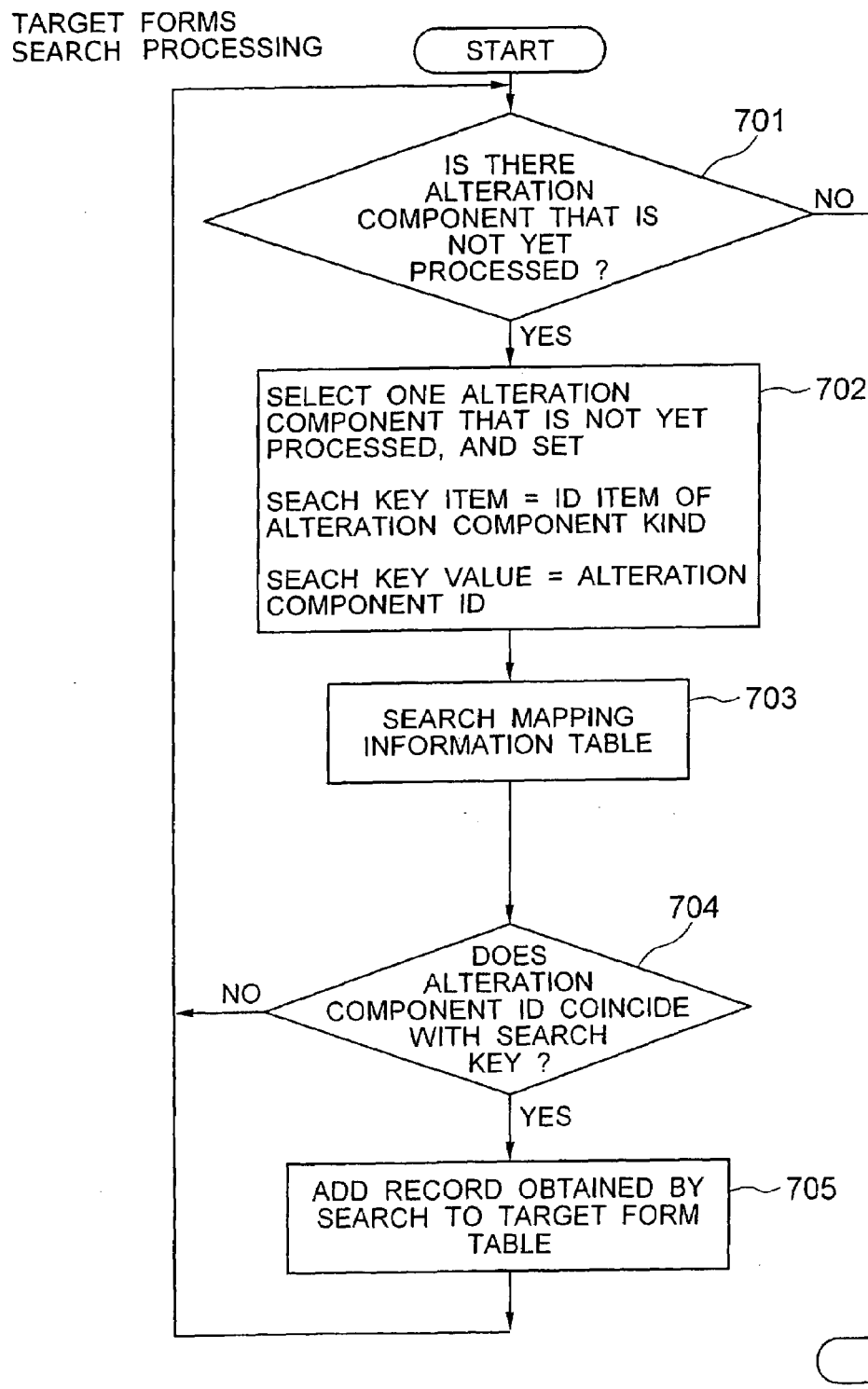
FIG. 7 is a flow chart showing a processing procedure of target form search processing executed in a related forms search module 117 of an embodiment.

FIG. 7 is a flow chart showing a processing procedure of target forms search processing executed in the related forms search module 117 of the present embodiment. In the target forms search processing, processing of listing target forms using the altered component is conducted.

In a process 701, the related forms search module 117 ascertains whether a target component which is not yet processed exists in the form updating information 103. If a target component which is not yet processed exists, the processing proceeds to a process 702. Otherwise, the processing flow is finished.

In the process 702, a target component which is not yet processed is selected from the form updating information 103. From information of the selected target component, a search key item and a search value for searching the mapping information table 112 are set on the basis of the information of the selected target component. Here, the search key item is a constraint ID and the search key value is C001.

In a process 703, the mapping information table 112 is searched by using the search key item and the search key value which have been set in the process 702. In a process 704, a result of search conducted in the process 703 is checked on. If the value of the search key item coincides with the search key value, the processing proceeds to a process 705. In the process 705, a whole record having a value of its search key item that coincides with the search key value is added to a target form table. The target form table is equivalent to a table obtained by adding a column of a form alteration kind to the same columns as those of the mapping information table 112.

FIG. 8 is a diagram showing an example of a form alteration kind setting view obtained as an execution result of target forms search processing indicated to the user 101 in the present embodiment. In the form alteration kind setting view shown in FIG. 8, a list of forms using the updated component is displayed. On the present view, the user 101 specifies every form whether the form should be overwritten, should be saved under an alias, or should not be altered.

The form alteration kind setting view includes the following three sections.

In a first section, i.e., target form 801, information concerning a target form is displayed. This is a form selected in the search view of FIG. 4 and shown in FIG. 5. Concrete items are a form ID, a form name, a keyword, a model presentation ID, a background ID and a constraint ID.

In a second section, i.e., a target component 802, an ID and a name of an altered component in the target form are presented. In the case where two or more components have been altered, each component is displayed on one line.

In a third section, i.e., a target component using form list 803, a list of forms using the target component is presented. The user 201 selects, for each of forms on this list, whether the form should be overwritten, should be saved under an alias, or should not be altered. In the case where there are a plurality of target components, all forms using one or more target components are listed.

The alteration kind of each form is input to the forms & components updating module 118 as the form updating information 103. Specifically, information stored in a part of <form alteration kind> shown in FIG. 6 is input.

According to the form alteration kind in the form updating information 103, the forms & components updating module 118 updates components and the record in the mapping information table 112, and/or inserts new data.

Figure 10:
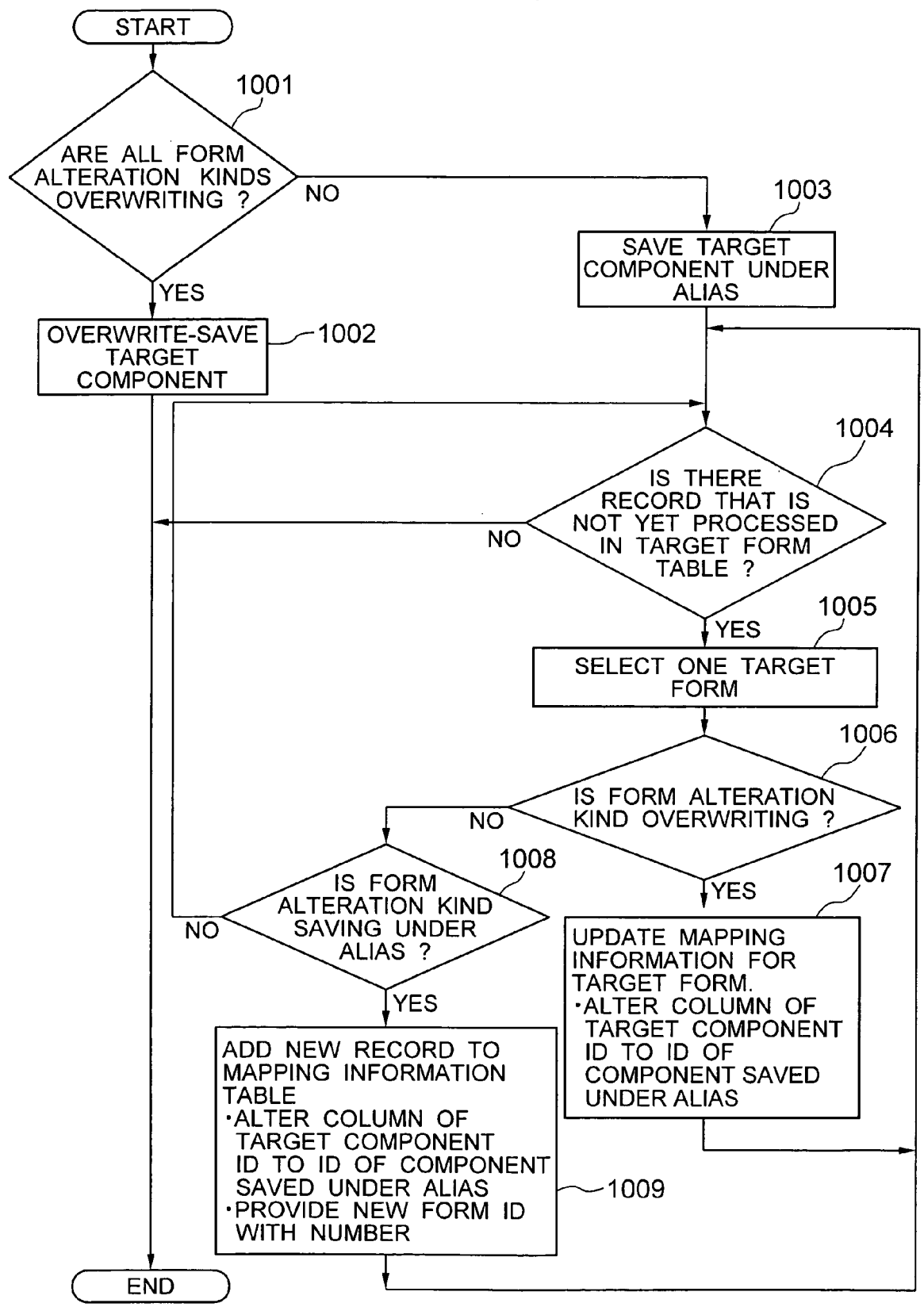
FIG. 10 is a flow chart showing a processing procedure in forms & components updating processing of an embodiment.

FIG. 10 is a flow chart showing a processing procedure in forms & components updating processing of the present embodiment. In a process 1001, the forms & components updating module 118 references the form updating information 103 and ascertains the alteration kind of the target form. If the alteration kinds of all target forms are overwriting, the processing proceeds to a process 1002. Otherwise, the processing proceeds to a process 1002.

In the process 1002, the record of the target component is updated on the basis of update target component and the alteration content in the form updating information 103. Specifically, in the constraint table 107, constraint contents of a record having a constraint ID=C001 are altered as shown in FIG. 11. As shown in the form updating information 103 in FIG. 6, alteration contents are three items: the number of characters, a minimum value and a maximum value.

FIG. 11 is a diagram showing an alteration content in contents of a constraint C001 in the electrical form design and management apparatus of the present embodiment. In FIG. 11, "xsd:totalDigits" represents the number of characters, and it is altered from "4" to "5." In FIG. 11, "xsd: minInclusive" represents the minimum value, and it is altered from "1001" to "10001." In FIG. 11, "xsd:maxInclusive" represents the maximum value, and it is altered from "9999" to "99999." In other items, there are no alterations.

In a process 1003, the target component is saved under an alias. Specifically, as for the constraint contents, altered contents are generated in the same way as the process 1002 and a new constraint ID is provided with a number, and then the contents are added to the constraint table 107 as a new record. In other words, as for the record indicating the constraint before alteration (constraint ID=C001), it is subject to processing of being left without being altered.

FIGS. 9A and 9B are diagrams showing presentation examples of a view for inputting a name of a component to be saved under an alias and a keyword in the present embodiment. FIG. 9A shows a display example of an alias input view 901 for inputting a name of a component to be saved under an alias and a keyword. The constraint ID is automatically provided with a number which is not yet used. A constraint name and a keyword are input by the user.

In the process 1004 and subsequent processes, processing concerning update of the mapping information table 112 is conducted. In the process 1004, it is determined whether a record which is not yet processed exists. If a record which is not yet processed exists, the processing proceeds to a process 1005. Otherwise, the present processing flow is finished.

In the process 1005, one target form which is not yet processed is selected. In a process 1006, a form alteration kind in the form updating information 103 is ascertained as regards the target form selected in the process 1005. If the form alteration kind is overwriting, the processing proceeds to a process 1007. Otherwise, the processing proceeds to a process 1008.

In the process 1007, a record concerning the target form in the mapping information table 112 is updated by overwriting. In other words, an ID of the target component is altered to the ID of the component saved in the process 1003. In the example of the present embodiment, processing of altering the constraint ID to C301 is conducted.

On the other hand, in a process 1008, it is determined whether the form alteration kind is saving under an alias. If the form alteration kind is saving under an alias, the processing proceeds to a process 1009. Otherwise, the processing proceeds to the process 1004.

In the process 1009, a replica of a record concerning the target form selected in the process 1005 is updated, and the replica is added to the mapping information table 112 as a new record. In other words, with regard to the record of the replica, the ID of the update target component is altered to the ID of the component saved in the process 1003 in the same way as the process 1007, and a new form ID that is not present in the mapping information table 112 is taken and added to the mapping information table 112.

A result obtained by executing forms & components updating processing is displayed in an update result 902 shown in FIG. 9B. First and second forms saved under aliases are provided with new form IDs, and constraint IDs are updated. In a third record saved by overwriting, only the constraint ID is updated. In a fourth record specified that alteration should be not applied thereto, alteration is not applied.

If in the present embodiment all alteration kinds for electrical forms resulting from the search conducted by the related forms search module 117 indicate that overwrite saving should be conducted, contents of target components are overwitten with the updated content, as described above. If the alteration kinds for electrical forms resulting from the search include a kind other than the overwrite saving, contents of the target component are registered under an alias and overwriting or new addition of mapping information for the electrical forms is conducted. As a result, processing equivalent to conducting processing of overwrite saving, saving under an alias, or no alterations specified by the user 101 on the forms is conducted.

A hardware configuration of the present embodiment will now be described.

Figure 15:
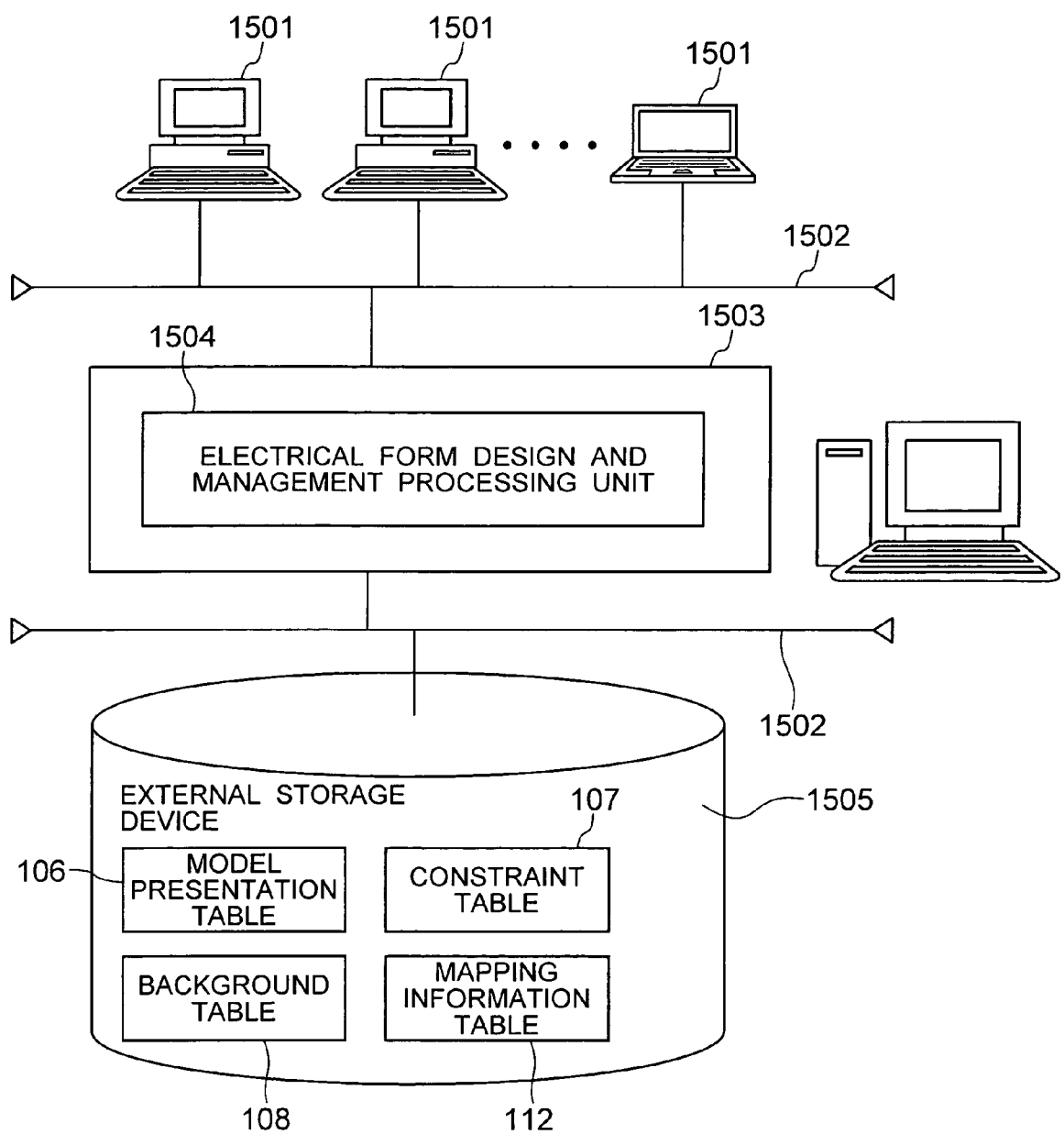
FIG. 15 is a diagram showing a hardware configuration of an electrical form design and management apparatus in an embodiment.

FIG. 15 is a diagram showing a hardware configuration of the electrical form design and management apparatus of the present embodiment. Reference numeral 1501 denotes a client terminal, 1502 a network, and 1503 a server machine. An electrical form design and management processing unit 1504 is mounted on the server machine 1503. The server machine 1503 is connected to an external storage device 1505 via a network. The model presentation table 106, the constraint table 107, the background table 108 and the mapping information table 112 are stored in the external storage device 1505.

Figure 16:
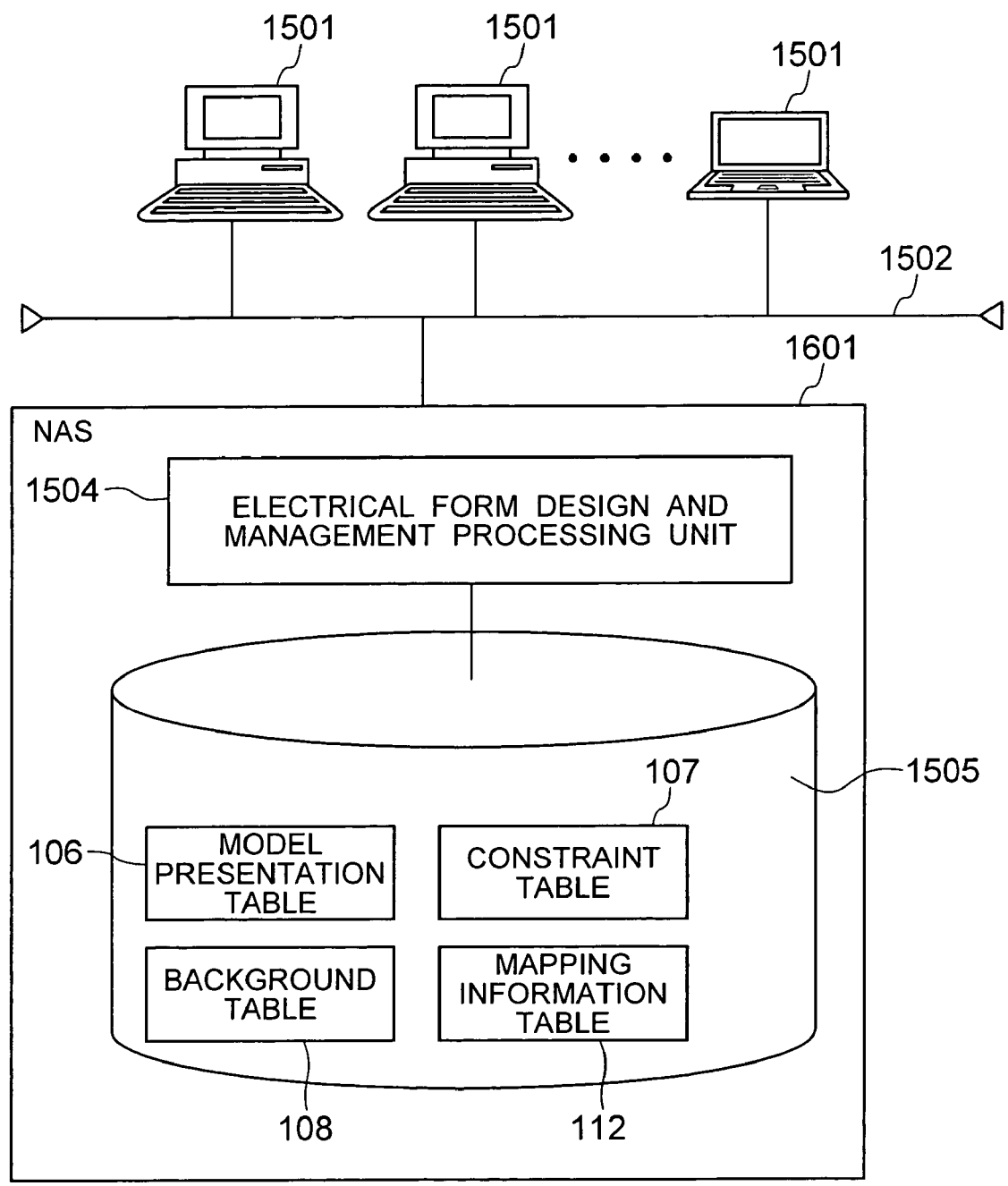
FIG. 16 is a diagram showing an example of a configuration using an NAS of an embodiment.

FIG. 16 is a diagram showing an example of a configuration using an NAS of the present embodiment. As shown in FIG. 16, a configuration using an NAS (Network Attached Storage) is also possible. In this case, the electrical form design and management processing unit 1504, which has been mounted on the server machine 1503 in FIG. 15, is mounted on the NAS, and consequently the server machine 1503 becomes unnecessary.

The embodiment heretofore described can be altered as hereafter described and implemented.

When updating a component included in an electrical form and thereby updating one or more forms collectively and conducting design and management of electrical forms, form and component grant management is conducted. In this case, the user 101 can reference only forms that the user is granted referencing privilege, and can overwrite-save only forms that the user is granted overwriting privilege. The user can save a form that the user is granted the reference privilege, under an alias, and the overwriting privilege includes reference privilege. As for components, the user 101 can reference the property for only components that the user is granted referencing privilege, and can overwrite only components that the user is granted overwriting privilege. The overwriting privilege includes the referencing privilege. The user can save a component that the user is granted referencing privilege, under an alias.

FIGS. 12A and 12B are diagrams showing examples of tables for grant management in the present embodiment. As shown in FIG. 12, the owner, grantee and privilege for each component are managed in a component grant management table 1201. In the privileges, there are two kinds: referencing and overwriting. In a form grant management table 1202, the OWNER, GRANTEE and PRIVILEGE for each form are managed. In the privileges, there are two kinds: referencing and overwriting.

For example, it is supposed that the user 101 is a user B. If the user B is not granted privilege of updating a form F002, the electrical form design and management apparatus of the present embodiment sets a column for overwriting in the form alteration kind to selection impossible. Specifically, in the target form search processing shown in FIG. 7, form alteration grant setting processing is added next to the step 701. In the present variant, a privilege column is newly added to the target form table.

Figure 13:
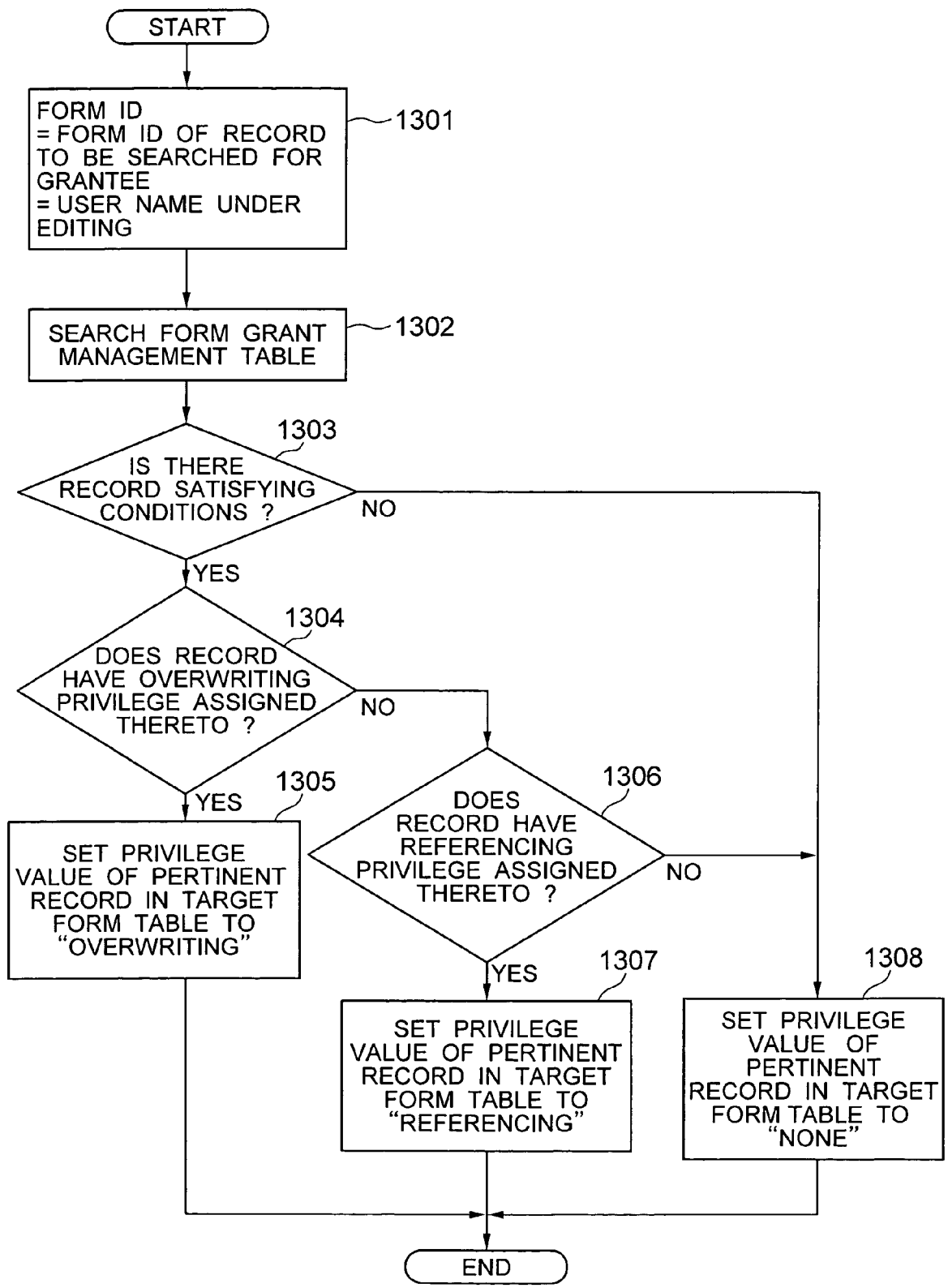
FIG. 13 is a flow chart showing a processing procedure of form alteration grant setting processing in an embodiment.

FIG. 13 is a flow chart showing a processing procedure of form alteration grant setting processing in the present embodiment. In a process 1301, a form ID of a search record added to the target form table in the process 705 is set into a form ID of the search target, and the GRANTEE is set to a user name under editing. In the present case, the GRANTEE is set to the user B.

In a process 1302, the form grant management table 1202 is searched by using the conditions set in the process 1301. In a process 1303, it is determined whether a record satisfying the conditions set in the process 1301 exists in the records obtained by the search. If a record satisfying the conditions set in the process 1301 exists, the processing proceeds to a process 1304. Otherwise, the processing proceeds to process 1308.

If in the process 1304 the value of the privilege column in the record obtained by the search is "overwriting," the processing proceeds to a process 1305. Otherwise, the processing proceeds to a process 1306.

In the process 1305, the value of the privilege of the pertinent record in the target form table is set to "overwriting." If in the process 1306 the value of the privilege column of the record obtained by the search is "referencing," the processing proceeds to a process 1307. In the process 1307, the value of the privilege of the pertinent record in the target form table is set to "referencing."

On the other hand, a process 1308 is executed in the case where the privilege is not registered in the combination of the form ID and the user name set in the process 1301. The value of the privilege of the pertinent record in the target form table is set to "none."

FIG. 14 is a diagram showing a presentation view example for a processing result of target forms search processing in the variant of the present embodiment. In FIG. 14, the same forms as those shown in FIG. 8 are listed as forms using "constraint ID: C001." However, the column of the form alteration kind is different. As regards the form of F002, it has become impossible to select "overwriting." This is because the user B is granted only referencing privilege as regards the form F002 in the form grant management table 1202. As regards the forms F003 and F004, it has become impossible to select "overwriting" or "saving under an alias." This is because the user B is not granted any privilege as regards the forms F003 and F004 in the form grant management table 1202.

If all alteration kinds of target forms are overwrite saving in the process 1001 shown in FIG. 10, the processing proceeds to the process 1002. Otherwise, the processing proceeds to the process 1003. According to the privileges, however, all alteration kinds become "no alteration" in some cases. At that time, the processing shown in FIG. 10 is immediately finished without conducting overwriting or saving under an alias.

In the present embodiment, electrical forms are managed by classifying them into components, such as the model presentation, the constraint and the background, and the components are updated, as described above. It thus becomes possible to update a plurality of electrical forms and generate new electrical forms. As a result, the efficiency of maintenance and development of electrical forms can be improved. Furthermore, by managing the privileges of referencing and updating the components and electrical forms, it is also possible to prevent an unintended user from making a mistake in updating components and forms.

According to the electrical form design and management apparatus of the present embodiment, electrical forms using an updated component are updated or generated collectively as heretofore described. As a result, the maintenance efficiency of electrical forms can be improved.

According to the present invention, electrical forms using an updated component are updated or generated collectively, and consequently the maintenance efficiency of electrical forms can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electrical form design and management method for conducting design and management of electrical forms, which contain models of input or output data, form presentation method, model constraints, and background image, the electrical form design and management method comprising the steps of:

referencing mapping information, which associates electrical forms with components, said components comprising:
a model presentation component for indicating elements of each of the electrical forms and their disposition locations,
a constraint component for indicating constraints for an input or output data item defined by a corresponding model presentation component,
and a background component for indicating information concerning application targets of the electrical forms in the electrical forms, searching for electrical forms using an updated component; and updating or adding components used in the electrical forms obtained by the search or mapping information of the electrical forms, and thereby updating or generating electrical forms.

2. The electrical form design and management method according to claim 1, wherein
if all alteration kinds for the electrical forms obtained by the search indicate that overwrite saving should be conducted, the updated component is overwritten with an update content, and
if an alteration kind other than the overwrite saving is included in the alteration kinds for the electrical forms obtained by the search, mapping information for the corresponding electrical forms is altered or newly added.

3. The electrical form design and management method according to claim 2, wherein privilege of referencing and updating the mapping information and the components is managed, and thereby components and electrical forms that can be subject to overwrite saving or saving under an alias are restricted for each user.

4. The electrical form design and management method according to claim 1, wherein
if all alteration kinds for the electrical forms obtained by the search indicate that overwrite saving should be conducted, the updated component is overwritten with an update content, and if an alteration kind other than the overwrite saving is included in the alteration kinds for the electrical forms obtained by the search, mapping information for the corresponding electrical forms is altered or newly added.

5. The electrical form design and management method according to claim 4, wherein privilege of referencing and updating the mapping information and the components is managed, and thereby components and electrical forms that can be subject to overwrite saving or saving under an alias are restricted for each user.

6. The electrical form design and management method according to claim 1, further comprising a step of managing, by use of a table of form IDs for users and privileges associated with the users, said privileges including referencing and updating the mapping information and the components, and thereby components and electrical forms that can be subject to overwrite saving or saving under an alias are restricted for each user.

* * * * *